Aug. 8, 1961 P. SCHMUCK 2,995,074
DEVICE FOR FOCUSING AN OPTICAL SYSTEM ARRANGED IN AN OPTICAL
APPARATUS, PREFERABLY IN A PHOTOGRAPHIC CAMERA
Filed Nov. 23, 1959
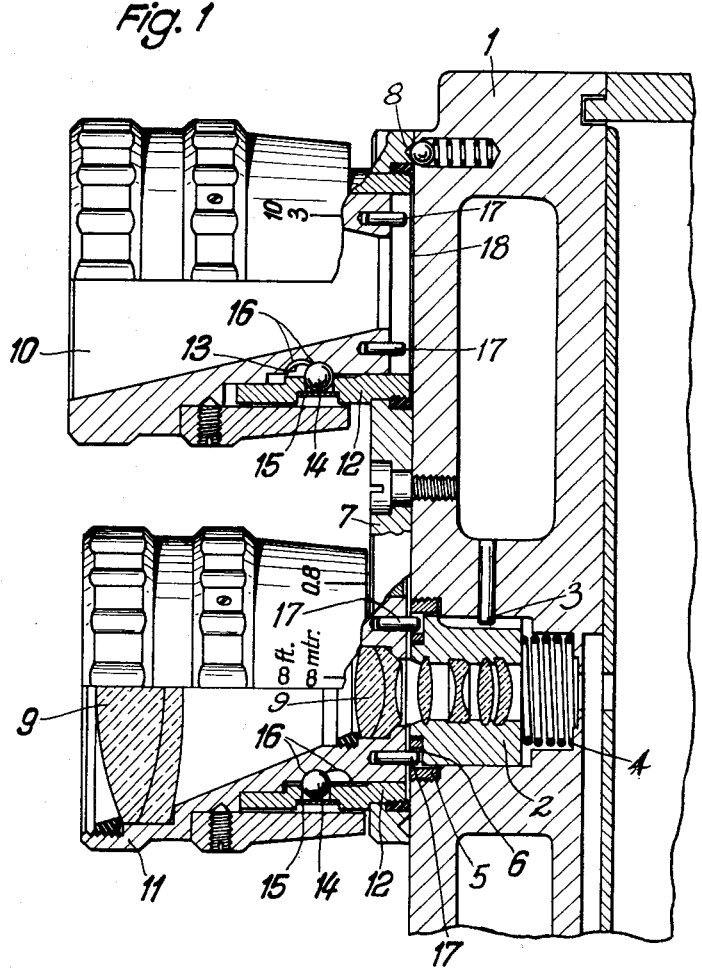
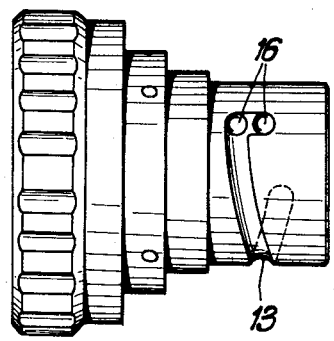
Inventor:
Peter Schmuck

United States Patent Office 2,995,074
Patented Aug. 8, 1961

2,995,074
DEVICE FOR FOCUSING AN OPTICAL SYSTEM ARRANGED IN AN OPTICAL APPARATUS, PREFERABLY IN A PHOTOGRAPHIC CAMERA
Peter Schmuck, Mauren, Liechtenstein, assignor to Contina Bureaux- und Rechenmaschinenfabrik Aktiengesellschaft, Mauren, Liechtenstein
Filed Nov. 23, 1959, Ser. No. 854,782
Claims priority, application Austria Nov. 25, 1958
11 Claims. (Cl. 95—45)

The present invention relates to a device for focusing an optical system arranged in an optical apparatus, preferably in a photographic camera.

The present invention relates to devices for focusing an optical system which is arranged in an optical apparatus, preferably a photographic camera, and which has different supplementary lenses associated therewith, one of which can be adjusted at a time together with the optical system in the optical axis of the latter. By means of such supplementary lenses which prolong or reduce the focal distance of the optical system and, if desired, increase or reduce the angular field, the optical apparatus, particularly the camera can be focused to various distances.

In such arrangement the optical system has previously been immovably arranged in the optical apparatus and the focusing was effected at the supplementary lenses. This changes the distance between the front and rear elements of the optical system, with the disadvantage that the focusing range is highly limited so that focusing to objects at relatively small distances is not possible because a vignetting effect occurs. The quality of the image is also reduced.

There is another possibility to enable an adjustment of the optical system itself, which consists generally of a normal camera lens, as well as of the supplementary lens. This enables focusing to very close objects without deterioration of the quality of the image produced if sources of error are eliminated which are then very likely to occur. As it is usual, to arrange the supplementary lenses on a slide or on a lens turret to enable them to be quickly and conveniently associated with the optical system as soon as it is desired to change the focus or angular field, provision must be made to prevent an engagement of the slide or turret with protruding parts of the mount of the optical system when the previous use of the optical system has resulted in an adjustment thereof which has not yet been eliminated and which has caused mount parts of the supplemental lenses used, of the optical system or both to come into the path of the slide or of the lens turret. On the other hand, provision must be made to prevent a focusing movement of the optical system and of that supplementary lens which is just to be used in conjunction with the optical system unless the optical axis of the supplementary lens coincides exactly with that of the optical system so that aberration does not occur.

The present invention is based on the recognition that these dangers can be eliminated.

In order to achieve this the invention is based on the known devices for focusing an optical system which is arranged in an optical apparatus, preferably a photographic camera, and which has various supplementary lenses associated therewith, one of which can be adjusted at a time together with the optical system in the optical axis of the latter. This does not involve difficulties where interchangeable supplementary lenses are used, which are connected by a screw thread or bayonet joint to the optical system which is effective as a rear unit. In such arrangements it has been known to provide for a certain interaction between the supplementary lenses and the optical system, e.g., by preventing a setting of the diaphragm provided in the optical system to apertures which exceed the largest light opening of the supplementary lens just in position. For this purpose, e.g., the mounts of the supplementary lenses have a groove of varying depth at the point where a feeler pin of the diaphragm adjusting system is disposed so that when a specific supplementary lens has been set in position a cam control will effect the necessary limitation of the maximum diaphragm aperture in the optical system on the camera side. New, however, is the proposal made according to the invention, which is based on said devices for focusing, to arrange the photographic system to be focused alone, independently of afocal supplementary lenses arranged on a common carrier, e.g., a lens turret. In this case the connection between the supplementary lens and the optical system of the camera, which connection is provided by screw threads or a bayonet joint, is eliminated because this would be prevented by the common carrier of the supplementary lenses, which can be selectively set. Additional measures are required to enable the adjustment of the optical system alone in the camera body in spite of the presence of this carrier. Without precluding the use of means preventing an engagement of mount parts and ensuring an exact position of optically effective parts in a common optical axis this is effected in a development of the invention in that a mount without lens, which mount is preferably congruent with the mounts of the supplementary lenses, is provided for focusing the optical system and suitably arranged on the common carrier. If the mounts of the supplementary lenses are constructed as parts of a coupling device with which focusing movements of the supplementary lenses can be transmitted to the optical system so that the latter is focused through the intermediary of the mounts of the supplementary lenses, the desired focusing of the optical system alone can be effected owing to the similar construction of the empty mount whereas it is possible to impart a joint focusing movement to both optical elements in that position of the lens turret in which any supplementary lens lies in the optical axis of the optical system. For this purpose the optical system is adjustable relative to the optical apparatus preferably by means of a screw thread the lead of which is equal to that of screw thread by which a supplementary lens and suitably the empty mount are adjustable relative to mount parts which are firmly connected to the common carrier.

To meet the above-mentioned requirements for an adequate reliability in operation, safety means will have to be provided which permit of a rotation of the lens turret only in a certain focused position of the optical system and which preclude focusing movements of the supplementary lenses when the optical axis of the supplementary lens which is associated at a time with the optical system differs from that of the optical system. The parts can be designed to constitute such safety means themselves if, e.g., the optical system is arranged in the optical apparatus to be longitudinally slidable and held against rotation and in engagement with a screw-threaded setting ring, which has recesses for receiving drivers which in the coupled position extend through the parting plane between the apparatus and the lens turret and which are arranged in a mount portion of the supplementary lens or of the empty mount, which mount portion is rotatable during focusing movements and is provided with a helical groove having axially directed extensions at its ends, which groove receives a segment of a locking ball, the remaining segment of which is resiliently received in the recess of a guide sleeve fixed to the lens turret, the axially directed extension of the helical groove being so related to the drivers that when the locking ball lies in an extension of the groove the drivers are in registry with the recesses in the screw-threaded focusing ring of the optical system. In order to provide for the above-mentioned suitable equality of the leads of the screw threads concerned the screw thread of the setting ring for the optical system has the same lead as the helical groove. The drivers consist suitably of cylindrical driver pins which are receivable in and adapted to close corresponding bores of the focusing ring for the optical system so that the coincidence of the optical axes of the supplementary lens used at a time and of the optical system can be provided with highest accuracy. The locking ball is suitably resiliently arranged so that a backlash-free movement of the parts engaged by it is ensured.

The drawing shows an embodiment of the invention exemplified in a lens turret for a motion picture camera. The optical system having a focal distance of, e.g., 13 mm., serves for normal shots. A supplementary lens having a smaller angular field is provided. This so-called telephoto supplement may have a focal distance of 26 or 39 mm. Another supplementary lens having a focal distance of 6.5 mm. is provided for shooting objects which require a highly enlarged angular field. Finally, an empty mount is provided, which does not contain a lens and serves only for focusing the optical system itself. This empty mount is congruent in form with the mounts of the supplementary lenses so that the lens turret can be provided with essentially identical supplementary lens mounts.

FIG. 1 is a sectional view showing such an empty mount and a supplementary lens in position for use.

FIG. 2 is a perspective view showing this supplementary lens removed from the lens turret.

In the drawing, 1 is a part of the camera body which serves for receiving the optical system 2 constituting the main lens of the camera. This optical system 2 is mounted in the camera body 1 and is axially displaceable therein and held against rotation by a straight guide 3. A spring 4 urges the lens 2 constantly without backlash against a ring 5, the outside circumference of which is provided with a screw thread with which its position in the camera body 1 is axially adjustable. This screw-threaded ring 5 which serves for focusing the lens 2 has apertures in the form of bores 6.

The rotatable lens turret consisting of the lens turret disc 7 lies flat against the camera body 1 at the end face of the housing part 1. A resiliently mounted detent ball 8 in conjunction with appropriate recesses in the lens turret disc 7 facilitates the finding and retaining of specific angular positions of the lens turret disc 7 relative to the camera body 1. In this way each of a number of different afocal supplementary lens 9, which prolong or reduce the focal distance of the optical system 2, can be moved to a position for use, in which its optical axis is an extension of the optical axis of the optical system 2. A mount 10 containing no lens is provided only for enabling the focusing of the optical system 2. The supplementary lens 9 which is just visible is also accommodated in a mount 11, which is constructed to be congruent, i.e., substantially identical with the empty mount 10. The other supplementary lenses which do not appear in the sectional view of FIG. 1 have also mounts which are substantially identical with the mounts 10, 11. Each of these mounts is rotatably and axially displaceably mounted on a guide sleeve 12 affixed in the lens turret disc 7. For this purpose a helical guide groove 13 is provided in the mount parts 10, 11, each of which receives a segment of a locking ball 14. The rest of the locking ball lies in the appropriately shaped and arranged recess of the guide sleeve 12. The locking ball 14 is under the influence of a striplike leaf spring 15, which is accommodated by an annular recess and thus ensures a movement of the parts 10, 12 or 11, 12 without backlash and enables the locking ball 14 to be received by axially directed groove extensions 16 arranged at the end of the groove 13. The mounts 10, 11 carry also drivers 17 in the form of cylindrical pins, which in the coupled position of the mounts of the optical system and of a supplementary lens or an empty mount are received by the bores 6 and in the uncoupled position are pulled entirely out of the bores 6. Such an uncoupled position is illustrated in FIG. 1 for the empty mount 10 whereas the mount 11 of the supplementary lens 9 just used is shown in coupled position. At those points where the camera body 1 is not interrupted to receive the mount of the optical system 2 or the screw-threaded ring 5 it has an entirely closed end face as is illustrated at 18.

The mode of operation of the device thus described is as follows:

As is apparent from FIG. 1 showing the mount 11 of the supplementary lens 9 coupled to the amount of the optical system 2 it is readily possible to focus by means of the mount 11 the optical system 2 and the supplementary lens 9 jointly to the distance required at any time. This will not change the distance between the front element of the optical system 2 and the rear element of the supplementary lens 9 because the screw-threaded ring 5 and the groove 13 have the same lead. FIG. 1 shows also that the same lens elements are spaced an extremely small distance apart so that vignetting effects are reliably avoided. In this coupled position the lens turret disc 7 is held against any rotation because the driver pins 17 lockingly extend through the parting plane between the lens turret disc 7 and the camera part 1. On the other hand the unused mounts of the other supplementary lenses and also the empty mount 10 are held against a rotation about their opitical axes, which rotation might cause the driver pins 17 to be out of registry with the apertures 6 when the mount is used for adjusting the optical system 2 so that it would be more difficult to couple the screw-threaded focusing ring 5 to the mounts 10, 11. To effect this rotation the locking ball 14 must be contained in the helical part of the groove 13. The locking ball cannot be moved to this position because this would require an axial movement of the mount 10 in a length which at least equals the length of the axial extensions 16 of the groove 13. Before this occurs, however, the driver pins 17 engage the closed surface 18 so that the mount 10 cannot be released for rotation in the position shown in FIG. 1. This will only vary when the empty mount 10 has been moved to the position of the mount 11. The driver pins 17 belonging to the mount 10 are then in registry with and can enter the apertures 6 in the screw-threaded focusing ring 5. Only this will enable the axial movement to be imparted to the mount 10, which movement in conjunction with the subsequent rotation of the mount 10 causes the locking ball 14 to enter the helical portion of the groove 13. At the same time this rotation is imparted by the pins 17 in the screw-threaded focusing ring 5 and by this ring to the optical system 2, which can thus be adjusted and focused together with the supplementary lens.

It is in the nature of the invention that it can be embodied in many different forms. E.g., where a supplementary lens is always used the empty mount 14 can be entirely eliminated. Nor need the locking element consist of a locking ball; differently shaped locking elements may also be used. The same applies to the drivers 17, which need not consist of pins but may have any other suitable shape.

What is claimed is:

1. A device for adjusting the optical system in an optical apparatus to predetermined positions relative to said apparatus, said optical system comprising a rear element and front elements associated therewith, said optical apparatus comprising a housing and a movable carrier for said front elements, which carrier is common to all said front elements, said carrier being adapted to be moved to a position in which the optical axes of the rear element of the optical system and one of said front elements coincide, and means adapted to adjust the rear element of said optical system relative to the housing of the optical apparatus in the direction of the optical axis of said rear element when said rear element is the only optically effective system of the apparatus, said device comprising further means adapted to effect a joint adjustment of said front and rear elements of said optical system in the direction of the optical axis relative to the optical apparatus when said rear element and one of said front elements which can be arranged in front thereof in its optical axis form the optically effective system of the apparatus.

2. A device for adjusting the optical system in an optical apparatus to predetermined positions relative to said apparatus, said optical system comprising a rear element and front elements associated therewith, said optical apparatus comprising a housing and a movable carrier for said front elements, which carrier is common to all said front elements, said carrier being adapted to be moved to a position in which the optical axes of the rear element of the optical system and one of said front elements coincide, and means adapted to adjust the rear element of said optical system relative to the housing of the optical apparatus in the direction of the optical axis of said rear element when said rear element is the only optically effective system of the apparatus, said device comprising mounts for the front elements of said optical system, said mounts being movable relative to said carrier to enable an adjustment of the front elements in the direction of their optical axis, said apparatus further comprising a mount for the rear element of the optical system, which mount is provided in addition to the mounts for the front elements of the optical system and movable relative to the carrier to adjust the rear element of said optical system in the direction of its optical axis.

3. A device for adjusting the optical system in an optical apparatus to predetermined positions relative to said apparatus, said optical system comprising a rear element and front elements associated therewith, said optical apparatus comprising a housing and a movable carrier for said front elements, which carrier is common to all said front elements, said carrier being adapted to be moved to a position in which the optical axes of the rear element of the optical system and one of said front elements coincide, and means adapted to adjust the rear element of said optical system relative to the housing of the optical apparatus in the direction of the optical axis of said rear element when said rear element is the only optically effective system of the apparatus, said device comprising mounts for the front elements of said optical system, said mounts being movable relative to said carrier to enable an adjustment of the front elements in the direction of their optical axis, said apparatus further comprising a mount for the rear element of the optical system, which mount is provided in addition to the mounts for the front elements of the optical system and movable relative to the carrier to adjust the rear element of said optical system in the direction of its optical axis, said mount for adjusting the rear element of the optical system being congruent with the mounts for adjusting the front elements of the optical system.

4. A photographic camera comprising, in combination, a camera housing, a camera lens in said housing, a mount for the optical system of said camera lens, an aperture formed in said camera housing and adapted to receive said mount with freedom of sliding movement in the direction of the optical axis of the lens, a spring between the mount and the housing wall which defines the aperture, said spring being adapted to urge the mount out of the housing, a stop adapted to prevent the urging of the mount out of the camera housing, said stop consisting of a screw-threaded adjusting ring which engages a screw-threaded aperture of the camera housing and which is adapted to be angularly adjusted relative to the camera housing to adjust the camera lens in the direction of its optical axis, a turret disc which is rotatable relative to the camera housing and adapted to be set to certain angular positions relative to the housing and to be retained in one of said positions, supplementary lenses for the camera lens and mounts for said supplementary lenses, guide sleeves for said mounts, which sleeves are arranged on said turret disc, an empty mount, a guide sleeve for said empty mount, helices arranged between said guide sleeves and mounts, including the empty mount, said helices being adapted to effect an adjustment of the mounts and the empty amount in the direction of the axis thereof when said mounts and empty mount are rotated about said axes, coupling means effective between the mounts and the screw-threaded adjusting ring of the camera lens, said coupling means being adapted to transmit the rotary movement of a mount to the adjusting ring of the camera lens.

5. A photographic camera as set forth in claim 4, said helices being formed by grooves formed partly in the mounts and partly in the guide sleeves, said grooves having a helical portion and another portion which is an extension at one end of the helical portion and parallel to the optical axis about which the mount which forms a part of the groove is rotatable, a ball in said groove, said coupling means consisting of pins attached to the mounts, said screw-threaded adjusting ring for the camera lens having recesses adapted to receive the coupling pins in those angular positions of the mounts of the supplementary lenses in which said ball is disposed in the straight portion of the groove forming said helix, and the lead of the groove forming said helix equalling the lead of the screw-threaded adjusting ring.

6. A photographic camera as set forth in claim 4, said helix being formed by a groove formed partly in the empty mount and partly in the guide sleeve, said groove having a helical portion and another portion which is an extension at one end of the helical portion and parallel to the optical axis about which the mount which forms a part of the groove is rotatable, a ball in said groove, said coupling means consisting of pins attached to the mounts, said screw-threaded adjusting ring for the camera lens having apertures adapted to receive the coupling pins of said empty mount when said ball is disposed in the straight portion of the groove forming said helix, and the lead of the groove forming said helix equalling the lead of the screw-threaded adjusting ring.

7. In a camera, in combination, a camera housing having a front wall; a main lens carried by said front wall; guide means carried by said front wall and cooperating with said main lens for guiding the latter for movement along its optical axis; at least two supplementary lens mounts; a supplementary lens carried by only one of said lens mounts, so that the other of said lens mounts is empty; carrier means carrying said lens mounts; means connecting said carrier means to said front wall for movement with respect thereto a plurality of positions where said lens mounts are respectively aligned with the optical axis of said main lens; focusing means forming part of each of said lens mounts; and motion transmitting means carried by each of said lens mounts and cooperating with said main lens when the lens mounts are respectively in said positions for transmitting movement of said focusing means to said main lens for shifting the latter along the optical axis, whereby when the empty lens mount is aligned with the optical axis of said main lens the exposure of the film will be determined solely by said main lens, whereas when said one lens mount is aligned with the optical axis of said main lens the exposure will be determined by the combination of said main lens and supplementary lens.

8. In a camera, in combination, a camera housing having a front wall; a main lens carried by said front wall; guide means carried by said front wall and cooperating with said main lens for guiding the latter for shifting movement along its optical axis; a ring threadedly carried by said front wall coaxially with said main lens and limiting the movement thereof in a forward direction, said ring being formed with a bore; spring means carried by said front wall and cooperating with said main lens for urging the latter forwardly against said ring; a pair of lens mounts; a supplementary lens carried by only one of said lens mounts so that the other lens mount is empty; focusing means turnable about the axis of each lens mount; carrier means common to said lens mounts and located next to said front wall of said camera housing; means connecting said carrier means to said camera housing for movement to a pair of positions where said mounts are respectively aligned with the optical axis of said main lens; and a motion transmitting pin carried by each focusing means and located in said bore of said ring when said lens mounts are respectively aligned with the optical axis of said main lens so that rotary movement of said focusing means will be transmitted to said ring for focusing said main lens, whereby when the empty lens mount is aligned with the optical axis only said main lens will be shifted along the optical axis while when said one lens mount is in said position aligned with the optical axis of said main lens both said main lens and said supplementary lens will be adjusted by said focusing means.

9. In a camera as recited in claim 8, said pin cooperating with said ring for preventing movement of said carrier to change the lens mount which is aligned with said main lens until said pin is located forwardly out of the bore of said ring, each lens mount including a means for moving said pin thereof forwardly out of said bore to release said carrier means for movement.

10. In a camera as recited in claim 8, said pin cooperating with said ring for preventing movement of said carrier to change the lens mount which is aligned with said main lens until said pin is located forwardly out of the bore of said ring, each lens mount including a means for moving said pin thereof forwardly out of said bore to release said carrier means for movement, said front wall of said camera housing being located directly next to a free end of said pin when the latter is located forwardly out of said bore so that the pin cannot be moved rearwardly until aligned with said bore.

11. In a camera as recited in claim 10, lock means forming part of each lens mount for locking said focusing means thereof against movement until said pin is located in said bore.

References Cited in the file of this patent

UNITED STATES PATENTS 2,510,360     Zuber _____ June 6, 1950